US008528316B2

(12) United States Patent
Baker et al.

(10) Patent No.: US 8,528,316 B2
(45) Date of Patent: Sep. 10, 2013

(54) SOLID PROPELLANT GAS CONTROL SYSTEM AND METHOD

(75) Inventors: Mark H. Baker, Scottsdale, AZ (US); Steve Abel, Chandler, AZ (US); George Woessner, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1375 days.

(21) Appl. No.: 12/429,003

(22) Filed: Apr. 23, 2009

(65) Prior Publication Data

US 2010/0269484 A1    Oct. 28, 2010

(51) Int. Cl.
F02K 9/80    (2006.01)
F02K 9/84    (2006.01)
F02K 9/26    (2006.01)
F02K 9/86    (2006.01)

(52) U.S. Cl.
USPC ............... 60/204; 60/256; 60/233; 701/13; 701/531; 244/3.2; 244/3.22; 244/171

(58) Field of Classification Search
USPC ............... 701/13, 531; 244/3.15, 3.2, 3.21, 244/3.22, 164, 169–171; 60/204, 233, 234, 60/251, 253, 254, 256, 789
See application file for complete search history.

(56) References Cited

U.S. PATENT DOCUMENTS

| 4,550,888 | A | 11/1985 | Douglass et al. |
| 4,765,565 | A | 8/1988 | Buchele-Buecher et al. |
| 4,786,018 | A | 11/1988 | Cope |
| 4,928,906 | A | 5/1990 | Sturm |
| 4,958,788 | A | 9/1990 | Namera et al. |
| 5,062,593 | A | 11/1991 | Goddard et al. |
| 5,172,547 | A | 12/1992 | Lawrence et al. |
| 5,411,227 | A | 5/1995 | Basuthakur et al. |
| 5,456,425 | A | 10/1995 | Morris et al. |
| 6,205,378 | B1 | 3/2001 | Rodden et al. |
| 6,267,326 | B1 | 7/2001 | Smith et al. |
| 6,412,275 | B1 | 7/2002 | Perrucci |
| 7,000,638 | B2 * | 2/2006 | Tseng et al. ................... 137/819 |
| 7,051,512 | B2 * | 5/2006 | Christensen et al. ........... 60/229 |
| 7,216,036 | B2 * | 5/2007 | Brady et al. ................... 701/510 |
| 2005/0284128 | A1 * | 12/2005 | Anderson et al. ............... 60/204 |
| 2007/0204593 | A1 * | 9/2007 | Cover et al. ..................... 60/204 |
| 2008/0216462 | A1 * | 9/2008 | Woessner et al. ............... 60/254 |

OTHER PUBLICATIONS

Philip G. Hill and Carl R. Peterson, Mechanics and Thermodynamics of Propulsion, 1965, Addison-Wesley Publishing, Third Edition, p. 356.*

* cited by examiner

Primary Examiner — Phutthiwat Wongwian
Assistant Examiner — Karthik Subramanian
(74) Attorney, Agent, or Firm — Ingrassia Fisher & Lorenz, P.C.

(57) ABSTRACT

Systems and methods of controlling solid propellant gas pressure and vehicle thrust are provided. Propellant gas pressure and a vehicle inertial characteristic are sensed. Propellant gas pressure commands and vehicle thrust commands are generated. A propellant gas pressure error is determined based on the propellant gas pressure commands and the sensed propellant gas pressure, and vehicle thrust error is determined based on the vehicle thrust commands and the sensed vehicle inertial characteristic. Reaction control valves are moved between closed and full-open positions based on the determined propellant gas pressure error and on the determined vehicle thrust error. The system and method allow the reaction control valves to operate at variable frequencies or at fixed frequencies. The system and method also allows propellant pressure to be commanded to follow a predetermined pressure profile or commanded to vary "on-the-fly."

18 Claims, 7 Drawing Sheets

SOLID PROPELLANT GAS CONTROL SYSTEM AND METHOD

TECHNICAL FIELD

The present invention generally relates to propellant gas generation and, more particularly, to a system and method of controlling solid propellant gas generation and flow.

BACKGROUND

Solid propellant gas generators are used in rockets, missiles, interceptors, and various other vehicles and environments. For example, solid propellant gas generators may be used to generate propellant gas for both vehicle propulsion and direction control for missiles, munitions, and various spacecraft. A solid propellant gas generator typically includes a vessel that defines a combustion chamber within which one or more solid propellant masses are disposed. The solid propellant masses, when ignited, generate high-energy propellant gas. Depending upon the particular end-use system in which the solid gas generator is installed, the propellant gas may be supplied, or at least selectively supplied, to a rocket motor and/or reaction jets that may vary the thrust, pitch, yaw, roll or spin rate and other dynamic characteristics of a vehicle in flight, and/or to a gas turbine to generate backup power.

As is generally known, once a solid propellant mass is ignited, propellant gas generation continues until the entire mass is consumed. As is also generally known, the burn rate of a solid propellant mass may vary with the pressure in the combustion chamber. For example, if the combustion chamber pressure increases, the solid propellant burn rate increases. Conversely, if the combustion chamber pressure decreases, the propellant burn rate decreases. One way of controlling combustion chamber pressure, and thus propellant burn rate, is by controlling the effective flow area of a exhaust passage downstream of the combustion chamber. For example, if the effective flow area of the flow passage decreases, combustion chamber pressure increases, and vice-versa.

Various systems and methods have been developed for varying the effective flow area of a solid propellant gas generator exhaust passage. Such systems and methods include throttling propellant gas flow from the combustion chamber using a fixed or variable area orifice, throttling propellant gas flow from the combustion chamber via a variable position valve, and including multiple propellant grains, which are then selectively ignited. Although these systems and methods are effective, each suffers certain drawbacks. For example, the present systems and methods can significantly affect overall gas generator efficiency, and may rely on fairly complex, relatively heavy, and or relatively costly components and control systems.

Hence, there is a need for a system and method of controlling solid propellant burn rate while also providing flexible vehicle thrust control that does not significantly affect overall efficiency and/or does not rely on fairly complex, relatively heavy, and/or relatively costly components and control systems. The present invention addresses one or more of these needs.

BRIEF SUMMARY

In one exemplary embodiment, a solid propellant gas control system includes a solid propellant gas generator, a propellant state sensor, a vehicle inertial motion sensor, a plurality of reaction control valves, and a controller. The solid propellant gas generator is configured to generate and supply a propellant gas. The propellant state sensor is configured to sense a parameter representative of propellant gas pressure and to supply pressure feedback signals representative of the sensed propellant gas pressure. The vehicle inertial motion sensor is configured to sense a vehicle inertial characteristic and to supply vehicle inertial response signals representative of the sensed vehicle inertial characteristic. The plurality of reaction control valves are in fluid communication with the propellant gas generator. Each reaction control valve is coupled to receive reaction control signals and is responsive thereto to selectively move between a closed position and a full-open position. The controller is coupled to receive propellant gas pressure commands, vehicle thrust commands, the pressure feedback signals, and the vehicle inertial response signals, and is configured, in response to these signals, to determine a propellant gas pressure error based on the propellant gas pressure commands and the pressure feedback signals, determine a thrust error based on the vehicle thrust commands and the vehicle inertial response signals, determine the reaction control signals based on the determined propellant gas pressure error and the determined thrust error, and supply the reaction control signals to the reaction control valves.

In another exemplary embodiment, a solid propellant gas control system includes a vessel defining a combustion chamber, a propellant state sensor, a vehicle inertial motion sensor, a plurality of reaction control valves, and a controller. The solid propellant is disposed within the combustion chamber and is configured to generate the propellant gas upon being ignited. The propellant state sensor is configured to sense a parameter representative of propellant gas pressure and to supply pressure feedback signals representative of the sensed propellant gas pressure. The vehicle inertial motion sensor is configured to sense a vehicle inertial characteristic and to supply vehicle inertial response signals representative of the sensed vehicle inertial characteristic. The plurality of reaction control valves are in fluid communication with the combustion chamber. Each reaction control valve is coupled to receive reaction control signals and is responsive thereto to selectively move between a closed position and a full-open position. The controller is coupled to receive propellant gas pressure commands, vehicle thrust commands, the pressure feedback signals, and the vehicle inertial response signals, and is configured, in response to these signals, to determine a propellant gas pressure error based on the propellant gas pressure commands and the pressure feedback signals, determine a thrust error based on the vehicle thrust commands and the vehicle inertial response signals, apply a priority weighting factor to the determined propellant gas pressure error to thereby generate a priority-weighted propellant gas pressure error, determine the reaction control signals based on the priority-weighted propellant gas pressure error and the determined thrust error, and supply the reaction control signals to the reaction control valves.

In yet another exemplary embodiment, a method of controlling propellant gas generation includes generating propellant gas and coupling a plurality of reaction control valves to receive the propellant gas. Each of the reaction control valves is movable between a closed position and a full-open position. Propellant gas pressure and a vehicle inertial characteristic are both sensed. Propellant gas pressure commands and vehicle thrust commands are both generated. A propellant gas pressure error is determined based on the propellant gas pressure commands and the sensed propellant gas pressure. A vehicle thrust error is determined based on the vehicle thrust commands and the sensed vehicle inertial characteristic. One or more of the reaction control valves are moved between the closed and full-open positions based on the determined propellant gas pressure error and on the determined vehicle thrust error.

Other independent features and advantages of the preferred solid propellant gas control system and method will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements, and wherein.

DETAILED DESCRIPTION OF VARIOUS PREFERRED EMBODIMENTS

The following detailed description is merely exemplary in nature and is not intended to limit the invention or the application and uses of the invention. Furthermore, there is no intention to be bound by any theory presented in the preceding background or the following detailed description. In this regard, although the systems and methods are described herein as being implemented in a vehicle, the systems and methods may also be used in energy storage and/or generation systems.

Figure 1:
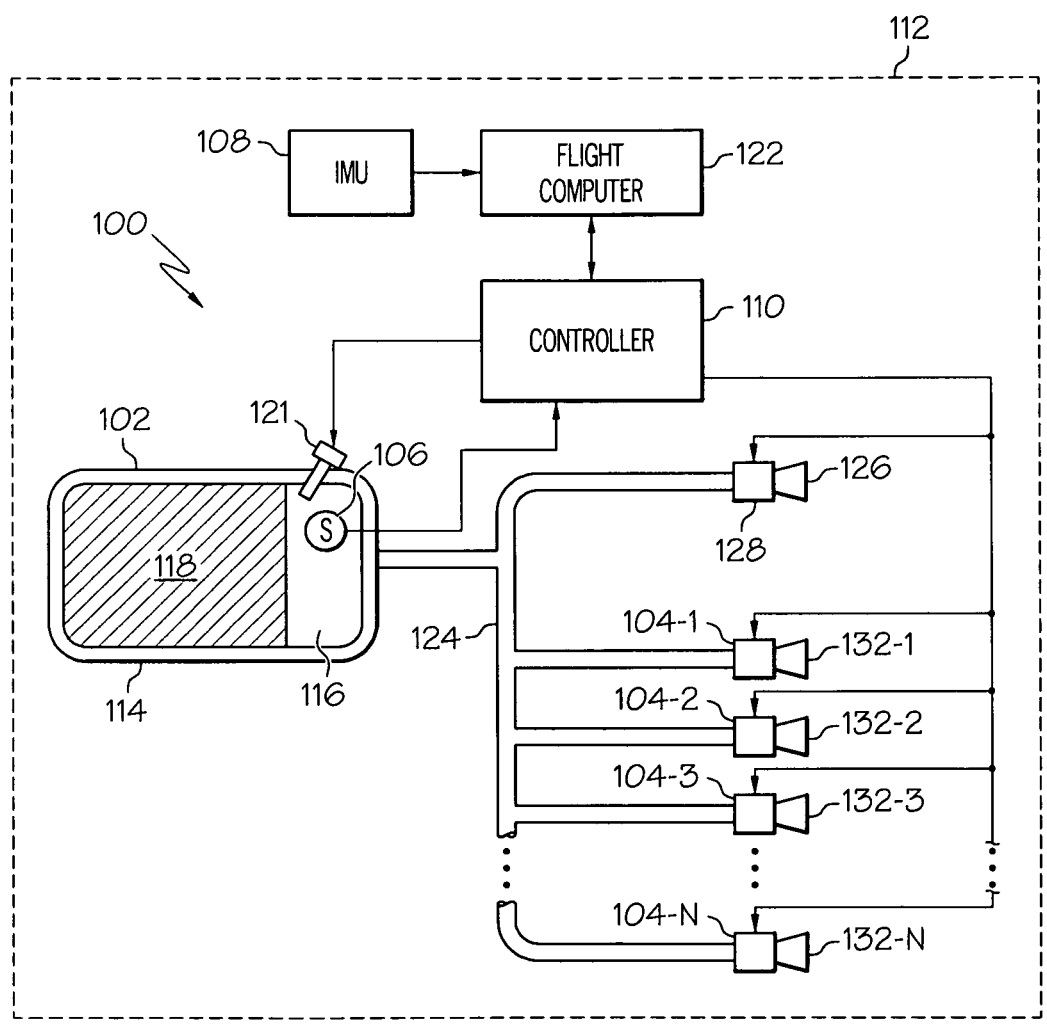
FIG. 1 is a functional block diagram of an exemplary embodiment of a solid propellant gas management system that may be used to implement a projectile thrust control system.

Turning first to FIG. 1, a functional block diagram of an exemplary embodiment of a solid propellant gas control system 100 is depicted. The system 100 includes a solid propellant gas generator 102, a plurality of reaction control valves 104 (e.g., 104-1, 104-1, 104-3, ... 104-N), one or more propellant state sensors 106, one or more vehicle inertial motion sensors 108, and a controller 110, which may all be disposed within a projectile body 112. The solid propellant gas generator 102 includes a vessel 114 that defines a combustion chamber 116 in which a solid propellant 118 is disposed. The manner in which the solid propellant 118 is formed and subsequently loaded into the combustion chamber 116 are generally well known, and will thus not be further discussed. Moreover, the particular type of solid propellant 118 may vary. Some non-limiting examples of solid propellant 118 include ammonium nitrate and ammonium perchlorate (as oxidizers) combined with a rubber like hydrocarbon (as the fuel). No matter the particular solid propellant 118 that is used, upon being ignited by an igniter 121, the solid propellant 118 produces propellant gas, which is directed toward the reaction control valves 104 via, for example, a suitable manifold 124. As FIG. 1 also depicts, the system 100 may additionally include, for example, a main thrust nozzle 126 and, if needed or desired, an associated main thrust control valve 128.

The reaction control valves 104 are each in fluid communication with the combustion chamber 116 via the manifold 124, and are each in fluid communication with a downstream thrust nozzle 132 (e.g., 132-1, 132-2, 132-3, ... 132-N). The reaction control valves 104 are each coupled to receive reaction control signals from the controller 110, and are each responsive to the reaction control signals it receives to selectively move between a closed position and a full-open position to thereby prevent and allow, respectively, propellant gas flow to its associated thrust nozzle 132. It will be appreciated that the reaction control valves 104 may be implemented using any one of numerous valve types and configurations now known or developed in the future, and that the number of reaction control valves 104 may vary. Some non-limiting examples of suitable valve types include suitably configured poppet valves, pintle valves, and fluidic diverter valves. It will additionally be appreciated that the thrust nozzles 132, which may also vary in number and configuration, are preferably arranged to provide suitable attitude and divert control for the projectile body 112. As FIG. 1 also depicts, the main thrust control valve 128, at least in some embodiments, may be coupled to receive thrust control signals from the controller 110, and may be responsive to the main thrust control signals it receives to selectively move between a closed and a full-open position, to thereby prevent and allow, respectively, propellant gas flow to the main thrust nozzle 126.

The controller 110, at least in the depicted embodiment, is configured to supply an initiation signal to the igniter 121, reaction control signals to the reaction control valves 104 and, as noted above, may also supply main thrust control signals to the main thrust control valve 128. The initiation signal supplied to the igniter 121 causes the igniter 121 to ignite the solid propellant 118, which in turn generates the propellant gas. It will be appreciated that in alternative embodiments the initiation signal could be supplied from other, non-illustrated devices or systems. As FIG. 1 also depicts, the controller 110 may also be in operable communication with a flight computer 122. The flight computer 122, which may be variously implemented and configured, is operable to supply propellant gas pressure commands and vehicle thrust commands to the controller 110. The propellant gas pressure commands are representative of a desired propellant gas pressure in the solid propellant gas generator 102. The vehicle thrust commands are representative of desired divert and/or attitude maneuvers to be implemented. It will be appreciated that, at least in some embodiments, the thrust commands may also be representative of desired main vehicle thrust. In any case, the controller 110 is responsive to the propellant gas pressure commands and the vehicle thrust commands, in a manner discussed in more detail further below, to selectively supply the reaction control signals and, at least in some embodiments, the main thrust control signals. It will additionally be appreciated that the controller 110 and flight computer 122, and their associated functions, could be integrated into a single device.

The controller 110 is preferably configured to implement closed loop control. As such, the controller 110 receives feedback signals from the one or more pressure sensors 106 and the one or more vehicle inertial motion sensors 108. The one or more propellant state sensors 106 are configured to sense one or more parameters representative of the pressure in the combustion chamber 116, and to supply feedback signals representative of the sensed propellant gas pressure to the controller 110. The number and type of propellant state sensors 106 may vary, and may include one or more pressure sensors and/or one or more temperature sensors. The one or more propellant state sensors 106 may sense the propellant gas pressure in or downstream of the combustion chamber 116.

The one or more vehicle inertial motion sensors 108 are configured to sense one or more vehicle inertial characteristics and to supply feedback signals representative of the one or more sensed vehicle inertial characteristics to the controller 110. As with the one or more propellant state sensors 106, the number and type of vehicle inertial motion sensors 108 may vary depending, for example, on the particular vehicle response characteristics to be sensed. For example, the system 100 may include various numbers of sensors to sense vehicle pitch, yaw and spin (roll) rates, and vehicle longitudinal and lateral speed and acceleration, just to name a few. The one or more vehicle inertial motion sensors 108 may also be specifically implemented for the system 100 or, as FIG. 1 depicts, may be integrated within a vehicle inertial measurement unit (IMU).

Figure 2:
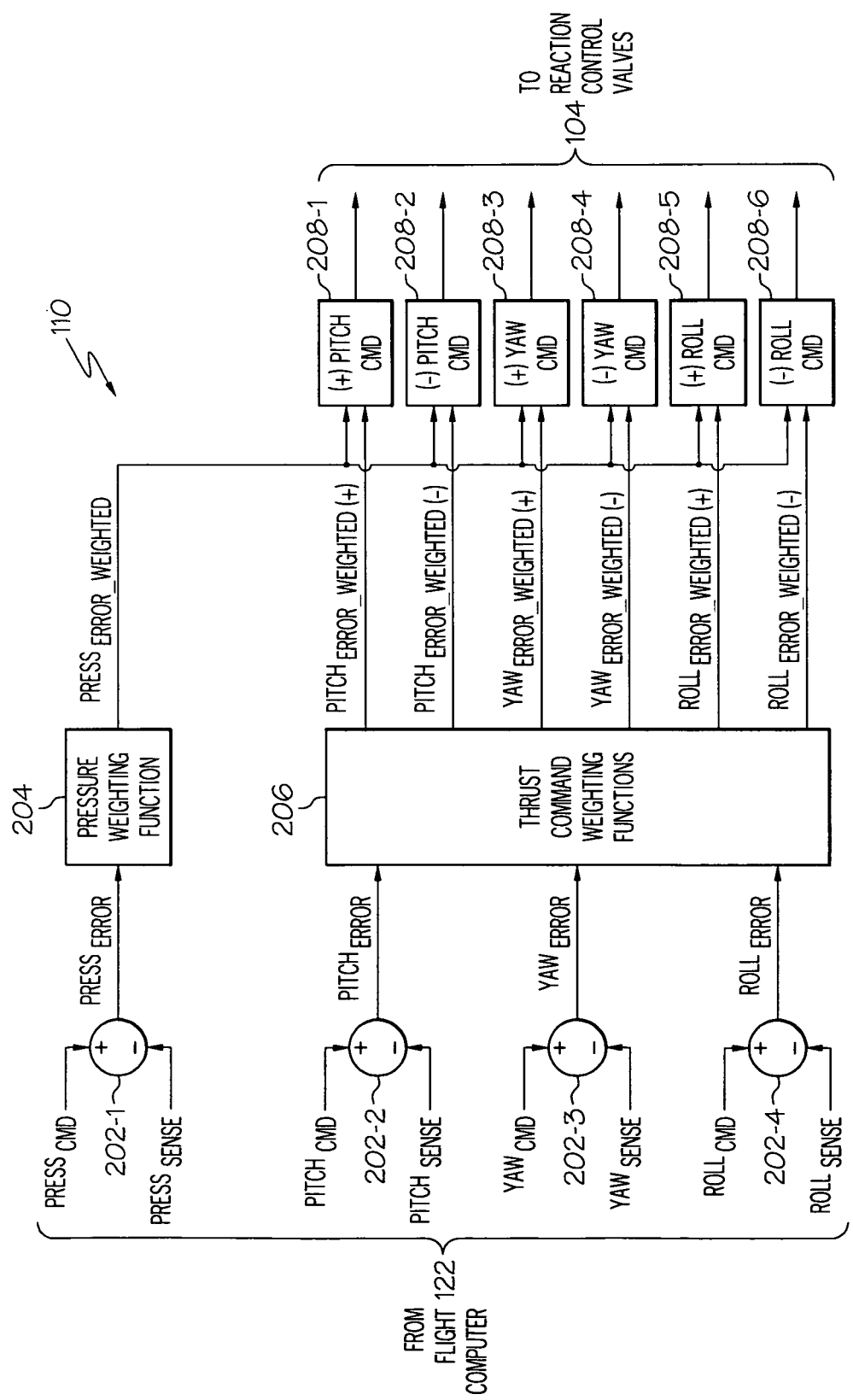
FIG. 2 depicts a functional block diagram of an exemplary controller that may be used to implement the system of FIG. 1.

As was noted above, the controller 110 is responsive to the propellant gas pressure commands and the vehicle thrust commands to selectively supply at least the reaction control signals to the reaction control valves 104. Turning now to FIG. 2, the particular manner in which the controller 110 implements this function will now be described. Before doing so, it is noted that the depicted controller 110 is implemented as a six channel, three-axis (e.g., pitch, yaw, and roll) controller 110. It will be appreciated that this is merely exemplary, and that the controller could be implemented as a two channel, single-axis controller or as a four channel, two-axis controller, just to name two non-limiting alternatives. The controller 110 could be implemented with various other numbers of channels, either greater than or less than six, if needed or desired. Moreover, the controller 110 could additionally be implemented, as alluded to above, with a channel for controlling overall vehicle thrust.

As FIG. 2 depicts, and as was previously noted, the controller 110 is coupled to receive propellant gas pressure commands ($PRESS_{CMD}$), the pressure feedback signals ($PRESS_{SENSE}$) from the one or more propellant state sensors 106, vehicle thrust commands ($PITCH_{CMD}$, $YAW_{CMD}$, $ROLL_{CMD}$), and the vehicle inertial response signals ($PITCH_{SENSE}$, $YAW_{SENSE}$, $ROLL_{SENSE}$) from the one or more vehicle inertial motion sensors 108. It will be appreciated that the source of the propellant gas pressure commands and the vehicle thrust commands may vary, but in the depicted embodiment the source is preferably the flight computer 122. It will additionally be appreciated that the propellant gas pressure commands may be used to implement various pressure control approaches. According to one approach, a predetermined propellant gas pressure profile may be commanded, which ensures that appropriate thrust will be available when commanded. According to another approach, the commanded propellant gas pressure may vary. For example, the propellant gas pressure may be commanded to mirror the commanded thrust, which improves propellant usage efficiency.

No matter the particular pressure control approach used, the commands and feedback signals are each supplied to suitable comparators 202 for determining a response error. More specifically, the propellant gas pressure commands ($PRESS_{CMD}$) and the pressure feedback signals ($PRESS_{SENSE}$) are supplied to a first comparator 202-1, which determines and supplies a pressure error signal ($PRESS_{ERROR}$). Similarly, the vehicle thrust commands ($PITCH_{CMD}$, $YAW_{CMD}$, $ROLL_{CMD}$) and the vehicle inertial response signals ($PITCH_{SENSE}$, $YAW_{SENSE}$, $ROLL_{SENSE}$) are each supplied to second, third, and fourth comparators 202-2, 202-3, 202-4, which each determine a thrust error ($PITCH_{ERROR}$, $YAW_{ERROR}$, $ROLL_{ERROR}$).

The controller 110 also implements what are referred to herein as weighting functions—a pressure weighting function 204 and thrust command weighting functions 206. These weighting functions 204, 206 are used to generate appropriately weighted errors. In particular, the pressure weighting function 204 supplies a weighted pressure error signal ($PRESS_{ERROR\_WEIGHTED}$), and the thrust command weighting functions 206, which are depicted for convenience using a single functional block, supply weighted thrust error signals ($PITCH_{ERROR\_WEIGHTED}$, $YAW_{ERROR\_WEIGHTED}$, $ROLL_{ERROR\_WEIGHTED}$). The pressure weighting function 204 and the thrust command weighting functions 206 are configured such that, when the appropriate reaction control signals are generated, priority is given to propellant gas pressure management. As may be appreciated, a priority weighting factor is applied to the propellant gas pressure error because if propellant gas pressure were allowed to go too low, the propellant gas generator 102 could extinguish. Alternatively, if propellant gas pressure were allowed to go too high, the propellant gas generator 102 could be over-pressurized. In effect, the pressure weighting prevents the thrust control from exceeding the boundaries of pressure control, and furthermore, assures that the thrust commands are compatible with the prevailing gas generator pressure.

The reaction control signals that are supplied to the reaction control valves 104 are generated by suitable thrust command generation blocks. In the depicted embodiment, these include a (+)-pitch command block 208-1, a (−)-pitch command block 208-2, a (+)-yaw command block 208-3, a (−)-yaw command block 208-4, a (+)-roll command block 208-5, and a (−)-roll command block 208-6. The thrust command generation blocks 208 each receive the weighted pressure error signal ($PRESS_{ERROR\_WEIGHTED}$) and one of the weighted thrust error signals ($PITCH_{ERROR\_WEIGHTED}$, $YAW_{ERROR\_WEIGHTED}$, $ROLL_{ERROR\_WEIGHTED}$), and supplies a reaction control signal to the appropriate reaction control valve 104. Before proceeding further, it is noted that the pressure weighting function 204, the thrust command weighting functions 206, and the thrust command generation blocks 208 may be variously configured to apply the priority weighting factor to the propellant gas pressure error, such that priority is given to propellant gas pressure management.

The controller 110, configured as described above, implements what is referred to herein as free-running control of the reaction control valves 104. That is, while the reaction control valves 104 are preferably responsive to the reaction control signals to be in either a closed position or a full-open position, the pulse widths of the reaction control signals are controlled as in a pulse width modulation (PWM) controller. Rather, the reaction control signals are simply determined based on the propellant gas pressure error and the thrust error(s), thereby producing a free-running pulsing of the reaction control valves 104. It will be appreciated that the frequency of the reaction control signals may, in some embodiments, not be predetermined, whereas in other embodiments, the frequency may be a determined, fixed frequency.

Figure 3A:
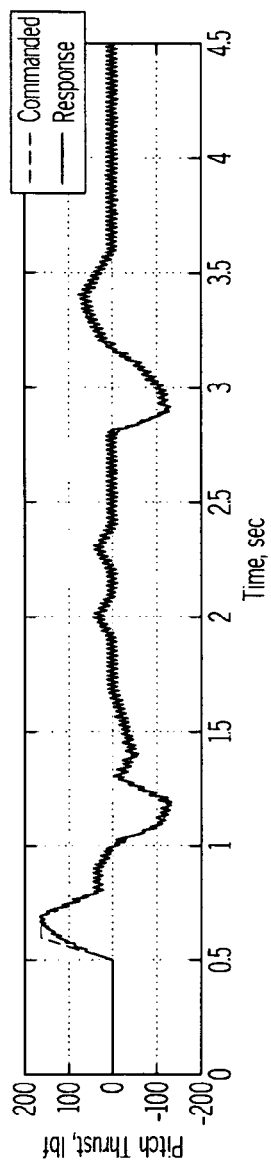
FIGS. 3A-3C depict graphs of thrust commands supplied to the controller of FIG. 2, and vehicle response to the commands, for a 4.5 second mission.
Figure 3B:
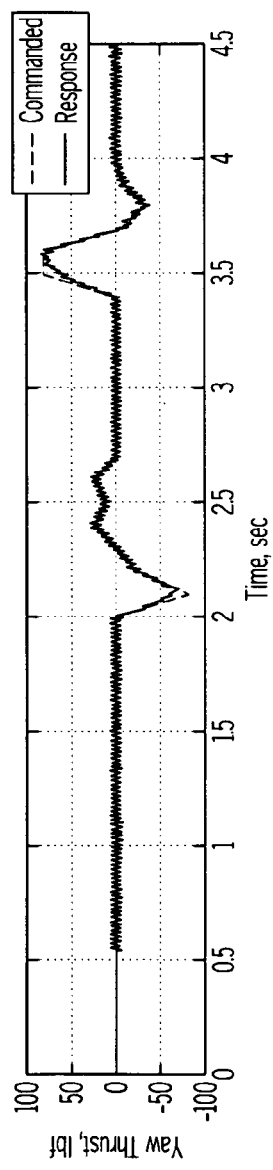
Figure 3C:
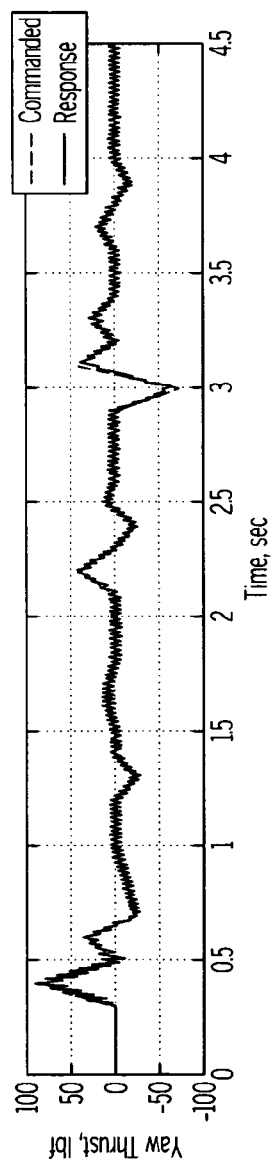
Figure 4:
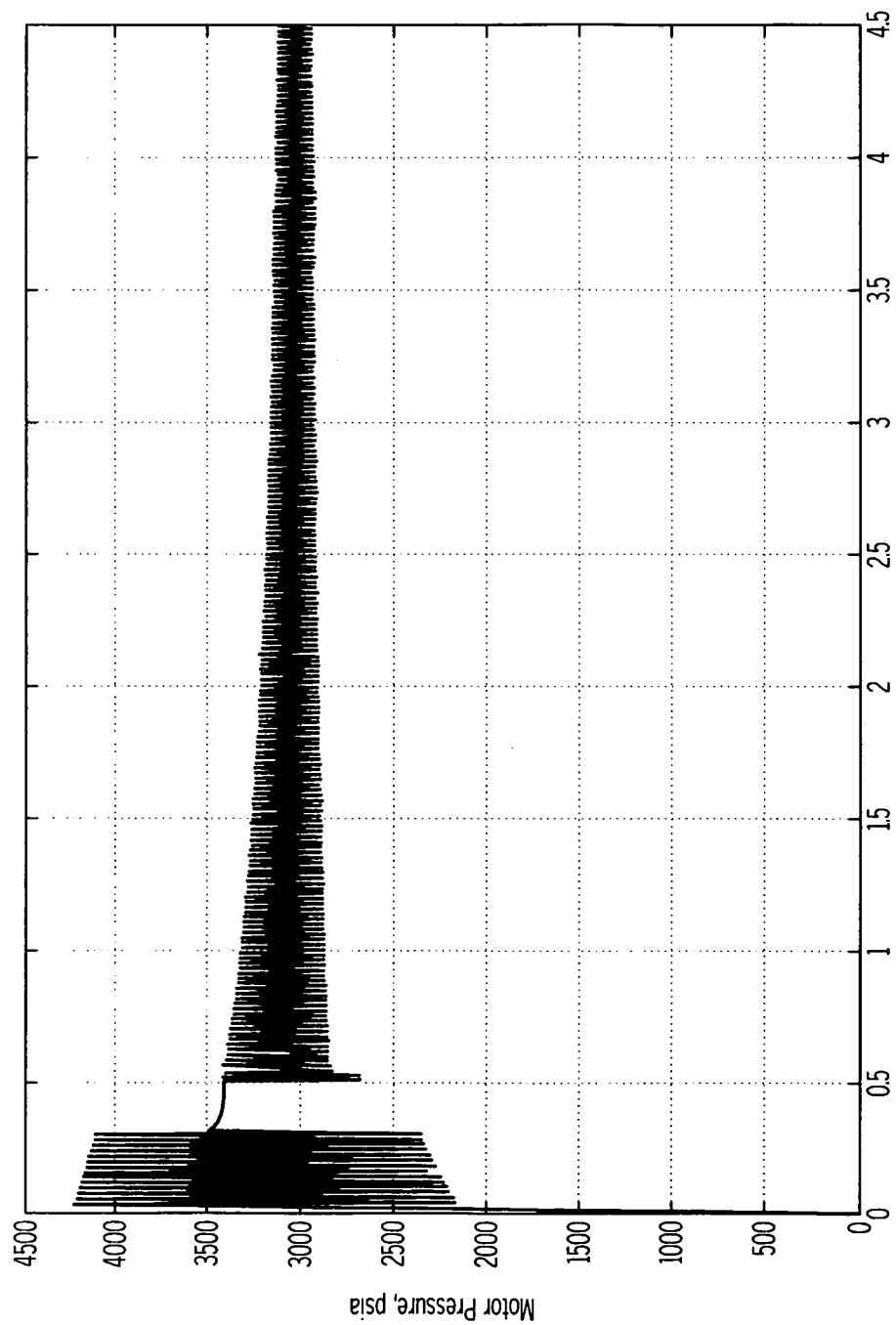
FIG. 4 depicts a graph of propellant gas pressure commands supplied to the controller of FIG. 2.
Figure 5A:
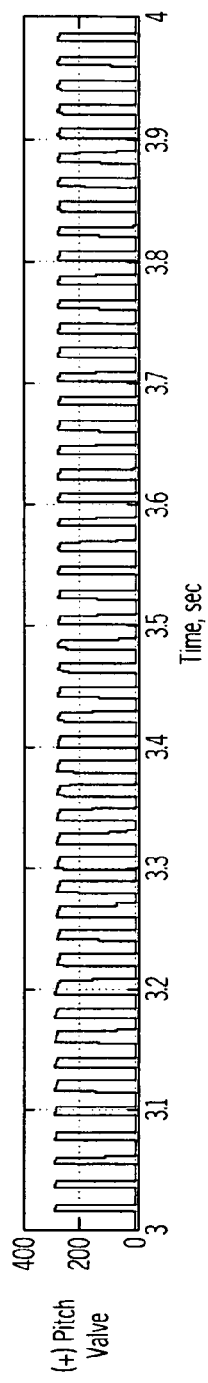
FIGS. 5A-5F depict graphs of thrust supplied via reaction control valves of the system depicted in FIG. 1 in response to the thrust commands depicted in FIG. 3.
Figure 5B:
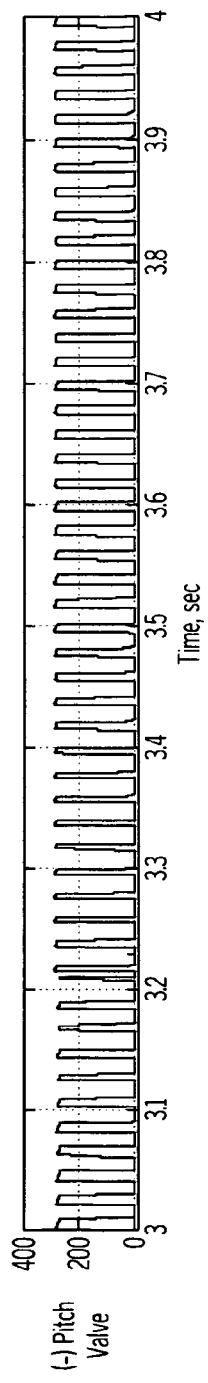
Figure 5C:
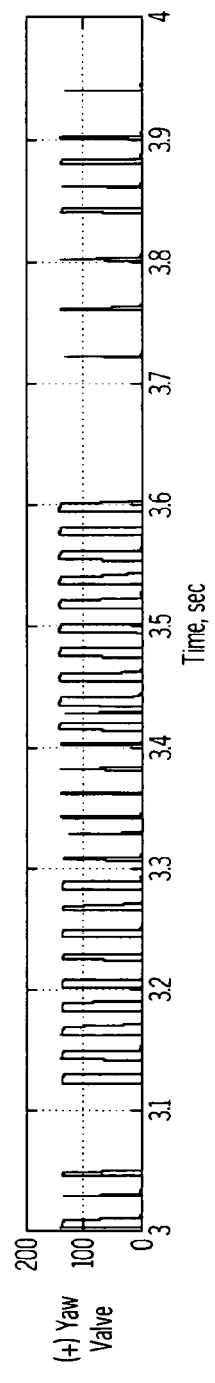
Figure 5D:
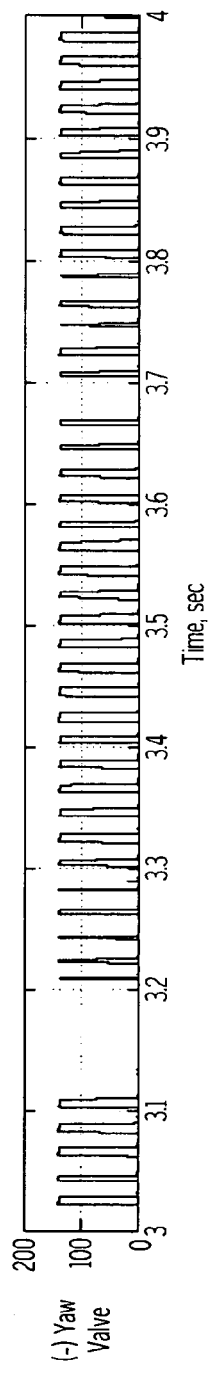
Figure 5E:
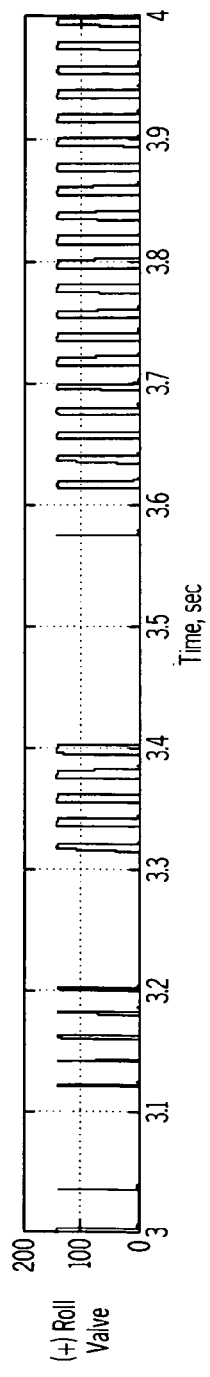
Figure 5F:
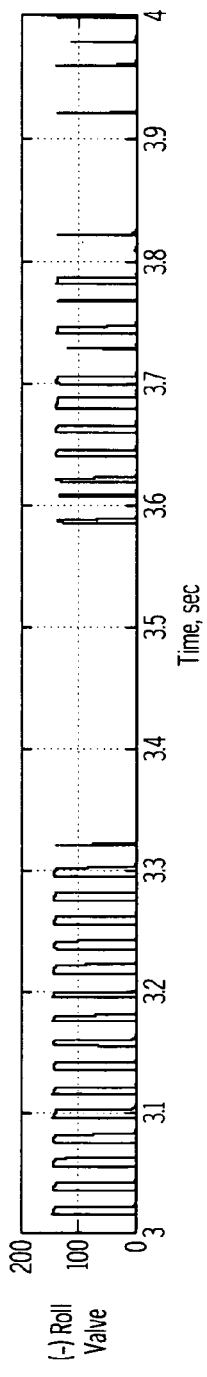
Figure 6:
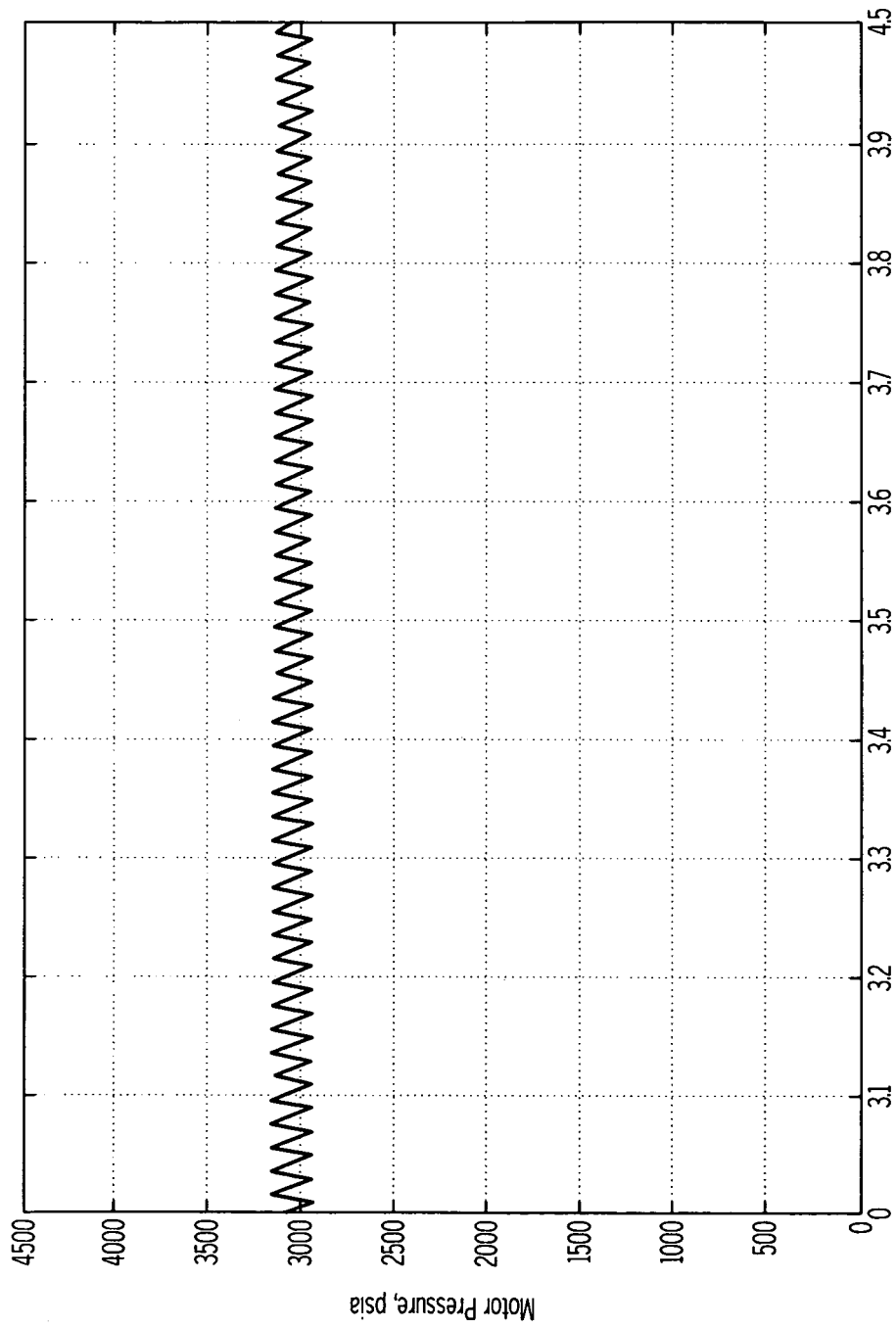
FIG. 6 depicts a graph of the propellant gas pressure response to the pressure commands depicted in FIG. 4.

To illustrate an example of the operation of the system 100, reference may now be made to FIGS. 3-6. In FIG. 3, the pitch, yaw, and roll commands supplied from the flight computer 122 to the controller 110 (and the vehicle response to the commands) for a 4.5 second mission are depicted, and in FIG. 4, the propellant gas pressure commands supplied from the flight computer 122 to the controller 110 for this same mission are depicted. The thrust supplied via each of the reaction control valves 104 in response to the thrust commands depicted in FIG. 3 are shown in FIG. 5, and the propellant gas pressure response to the pressure commands depicted in FIG. 4 are shown in FIG. 6. It is noted that for clarity of illustration the responses depicted in FIGS. 5 and 6 are only for one second (e.g., from 3.0 seconds to 4.0 seconds) of the 4.5 second mission.

The systems and methods disclosed herein provide for relatively efficient use of solid gas propellant, and for more accurate and responsive thrust and pressure control. The systems and methods provide for a more tailored thrust profile for a vehicle, and could also potentially reduce reaction control valve cycles relative to presently known systems and methods.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A solid propellant gas control system, comprising:
   a solid propellant gas generator configured to generate and supply a propellant gas;
   a propellant state sensor configured to sense a parameter representative of propellant gas pressure and to supply pressure feedback signals representative of the sensed propellant gas pressure;
   a vehicle inertial motion sensor configured to sense a vehicle inertial characteristic and to supply vehicle inertial response signals representative of the sensed vehicle inertial characteristic;
   a plurality of reaction control valves in fluid communication with the propellant gas generator, each reaction control valve coupled to receive reaction control signals and responsive thereto to selectively move between a closed position and a full-open position; and
   a controller coupled to receive propellant gas pressure commands, vehicle thrust commands, the pressure feedback signals, and the vehicle inertial response signals, and configured, in response to these signals, to:
   (i) determine a propellant gas pressure error based on the propellant gas pressure commands and the pressure feedback signals,
   (ii) determine a thrust error based on the vehicle thrust commands and the vehicle inertial response signals,
   (iii) determine the reaction control signals based on the determined propellant gas pressure error and the determined thrust error, and
   (iv) supply the reaction control signals to the reaction control valves.

2. The system of claim 1, wherein the controller is further configured to apply a priority weighting factor to the determined propellant gas pressure error.

3. The system of claim 1, further comprising:
   a flight computer operable to supply the propellant gas pressure commands and the vehicle thrust commands.

4. The system of claim 1, wherein the solid propellant gas pressure generator comprises:
   a vessel defining a combustion chamber; and
   a solid propellant disposed within the combustion chamber, the solid propellant configured to generate the propellant gas upon being ignited.

5. The system of claim 4, wherein:
   the solid propellant gas generator further comprises an igniter coupled to receive an initiation signal and configured, in response thereto, to ignite the solid propellant; and
   the controller is further configured to selectively supply the initiation signal.

6. The system of claim 1, further comprising:
   a plurality of reaction control thrust nozzles, each reaction control thrust nozzle disposed downstream of, and in fluid communication with, one of the reaction control valves, each reaction control thrust nozzle configured to generate a thrust when propellant gas flows therethrough.

7. The system of claim 1, further comprising:
   a main thrust nozzle in fluid communication with the solid propellant gas generator to at least selectively receive propellant gas therefrom.

8. The system of claim 7, wherein the main thrust nozzle is disposed downstream of, and in fluid communication with, one of the reaction control valves.

9. The system of claim 1, further comprising:
   a manifold in fluid communication with the solid propellant gas generator and each reaction control valve.

10. The system of claim 1, wherein the propellant state sensor includes one or more of a propellant gas temperature sensor and a propellant gas pressure sensor.

11. A solid propellant gas control system, comprising:
    a vessel defining a combustion chamber; and
    a solid propellant disposed within the combustion chamber, the solid propellant configured to generate the propellant gas upon being ignited;
    a propellant state sensor configured to sense a parameter representative of propellant gas pressure and to supply pressure feedback signals representative of the sensed propellant gas pressure;
    a vehicle inertial sensor configured to sense a vehicle inertial characteristic and to supply vehicle inertial response signals representative of the sensed vehicle inertial characteristic;
    a plurality of reaction control valves in fluid communication with the combustion chamber, each reaction control valve coupled to receive reaction control signals and responsive thereto to selectively move between a closed position and a full-open position; and
    a controller coupled to receive propellant gas pressure commands, vehicle thrust commands, the pressure feedback signals, and the vehicle inertial response signals, and configured, in response to these signals, to:
    (i) determine a propellant gas pressure error based on the propellant gas pressure commands and the pressure feedback signals,
    (ii) determine a thrust error based on the vehicle thrust commands and the vehicle inertial response signals,
    (iii) apply a priority weighting factor to the determined propellant gas pressure error, to thereby generate a priority-weighted propellant gas pressure error,
    (iv) determine the reaction control signals based on the priority-weighted propellant gas pressure error and the determined thrust error, and
    (v) supply the reaction control signals to the reaction control valves.

12. The system of claim 11, further comprising:
a flight computer operable to supply the propellant gas pressure commands and the vehicle thrust commands.

13. The system of claim 11, further comprising:
a plurality of reaction control thrust nozzles, each reaction control thrust nozzle disposed downstream of, and in fluid communication with, one of the reaction control valves, each reaction control thrust nozzle configured to generate a thrust when propellant gas flows therethrough.

14. The system of claim 11, further comprising:
a main thrust nozzle in fluid communication with the combustion chamber to at least selectively receive propellant gas therefrom.

15. The system of claim 14, wherein the main thrust nozzle is disposed downstream of, and in fluid communication with, one of the reaction control valves.

16. The system of claim 11, further comprising:
a manifold in fluid communication with the combustion chamber and each reaction control valve.

17. The system of claim 11, wherein the propellant state sensor includes one or more of a propellant gas temperature sensor and a propellant gas pressure sensor.

18. A method of controlling a propellant gas generation system, comprising the steps of:
generating propellant gas;
coupling a plurality of reaction control valves to receive the propellant gas, each of the reaction control valves movable between a closed position and a full-open position;
sensing propellant gas pressure;
sensing a vehicle inertial characteristic;
generating propellant gas pressure commands;
generating vehicle thrust commands;
determining a propellant gas pressure error based on the propellant gas pressure commands and the sensed propellant gas pressure;
determining a vehicle thrust error based on the vehicle thrust commands and the sensed vehicle inertial characteristic;
selectively moving one or more of the reaction control valves between the closed and full-open positions based on the determined propellant gas pressure error and on the determined vehicle thrust error.

* * * * *